US010911836B2

(12) United States Patent
Niemeijer

(10) Patent No.: US 10,911,836 B2
(45) Date of Patent: Feb. 2, 2021

(54) SYSTEM AND METHOD FOR DIGITAL PROGRAM INSERTION IN CABLE SYSTEMS

(71) Applicant: Visible World, LLC, Philadelphia, PA (US)

(72) Inventor: Gerrit Niemeijer, Maplewood, NJ (US)

(73) Assignee: Visible World, LLC, Philadelphia, PA (US)

( * ) Notice: Subject to any disclaimer, the term of this patent is extended or adjusted under 35 U.S.C. 154(b) by 0 days.

(21) Appl. No.: 14/739,093

(22) Filed: Jun. 15, 2015

(65) Prior Publication Data
US 2016/0007092 A1 Jan. 7, 2016

Related U.S. Application Data

(63) Continuation of application No. 11/202,283, filed on Aug. 11, 2005, now Pat. No. 9,060,200.
(Continued)

(51) Int. Cl.
H04N 21/81 (2011.01)
H04N 21/44 (2011.01)
(Continued)

(52) U.S. Cl.
CPC ....... *H04N 21/812* (2013.01); *H04N 21/2221* (2013.01); *H04N 21/2365* (2013.01); *H04N 21/23424* (2013.01); *H04N 21/254* (2013.01); *H04N 21/4383* (2013.01); *H04N 21/44016* (2013.01); *H04N 21/454* (2013.01); *H04N 21/458* (2013.01); *H04N 21/60* (2013.01); *H04N 21/633* (2013.01); *H04N 21/8455* (2013.01); *H04N 21/2668* (2013.01); *H04N 21/26241* (2013.01)

(58) Field of Classification Search
CPC ............. H04N 21/812; H04N 21/4532; H04N 7/17318; H04N 21/44222; H04N 21/25891; H04N 21/26681; H04N 21/23424; H04N 5/2723; H04N 21/258; H04N 21/25883; H04N 21/2221; H04N 21/2365; H04N 21/254; H04N 21/454; H04N 21/458; H04N 21/8455; H04N 21/4383; H04N 21/60; H04N 21/633; H04N 21/44016; H04N 21/26241; H04N 21/2668
See application file for complete search history.

(56) References Cited

U.S. PATENT DOCUMENTS 3,366,731 A 1/1968 Wallerstein
3,639,686 A 2/1972 Walker et al.
(Continued)

Primary Examiner — Anthony Bantamoi
(74) Attorney, Agent, or Firm — BakerHostetler

(57) ABSTRACT

Alternative approaches to the insertion of local commercials and messages into networks feeds are provided. Embodiments include digital commercial insertion for cable operators and others that not only offer more flexibility and features, but may also be significantly cheaper to implement. The actual "insert" of the local commercial or message into the digital program is performed by a standard set top box, with several methods of providing the local commercial to the set top box at the proper insertion time. Another embodiment allows a cable operator to significantly save on equipment in the form of splicers and ad inserters, by allowing easy and dynamic mapping of local commercials to insertion zones.

20 Claims, 12 Drawing Sheets

Related U.S. Application Data

(60) Provisional application No. 60/600,664, filed on Aug. 11, 2004.

(51) Int. Cl.
*H04N 21/633* (2011.01)
*H04N 21/60* (2011.01)
*H04N 21/438* (2011.01)
*H04N 21/222* (2011.01)
*H04N 21/234* (2011.01)
*H04N 21/2365* (2011.01)
*H04N 21/254* (2011.01)
*H04N 21/454* (2011.01)
*H04N 21/458* (2011.01)
*H04N 21/845* (2011.01)
*H04N 21/2668* (2011.01)
*H04N 21/262* (2011.01)

(56) References Cited

U.S. PATENT DOCUMENTS

| | | |
|---|---|---|
| 4,331,974 A | 5/1982 | Cogswell et al. |
| 4,475,123 A | 10/1984 | Dumbauld et al. |
| 4,573,072 A | 2/1986 | Freeman |
| 4,602,279 A | 7/1986 | Freeman |
| 4,625,235 A | 11/1986 | Watson |
| 4,638,359 A | 1/1987 | Watson |
| 4,703,423 A | 10/1987 | Bado et al. |
| 4,716,410 A | 12/1987 | Nozaki |
| 4,786,235 A | 11/1988 | Van der Veken |
| 4,789,235 A | 12/1988 | Borah et al. |
| 4,814,883 A | 3/1989 | Perine et al. |
| 4,847,698 A | 7/1989 | Freeman |
| 4,847,699 A | 7/1989 | Freeman |
| 4,847,700 A | 7/1989 | Freeman |
| 4,850,007 A | 7/1989 | Marino et al. |
| 4,918,516 A | 4/1990 | Freeman |
| 5,099,422 A | 3/1992 | Foresman et al. |
| 5,105,184 A | 4/1992 | Pirani et al. |
| 5,155,591 A | 10/1992 | Wachob |
| 5,173,900 A | 12/1992 | Miller et al. |
| 5,220,501 A | 6/1993 | Lawlor et al. |
| 5,231,494 A | 7/1993 | Wachob |
| RE34,340 E | 8/1993 | Freeman |
| 5,253,940 A | 10/1993 | Abecassis |
| 5,260,778 A | 11/1993 | Kauffman et al. |
| 5,291,395 A | 3/1994 | Abecassis |
| 5,305,195 A | 4/1994 | Murphy |
| 5,343,239 A | 8/1994 | Lappington et al. |
| 5,347,632 A | 9/1994 | Filepp et al. |
| 5,356,151 A | 10/1994 | Abecassis |
| 5,361,393 A | 11/1994 | Rossillo |
| 5,377,354 A | 12/1994 | Scannell et al. |
| 5,414,455 A | 5/1995 | Hooper et al. |
| 5,422,468 A | 6/1995 | Abecassis |
| 5,424,770 A | 6/1995 | Schmelzer et al. |
| 5,426,281 A | 6/1995 | Abecassis |
| 5,434,678 A | 7/1995 | Abecassis |
| 5,442,390 A | 8/1995 | Hooper et al. |
| 5,442,771 A | 8/1995 | Filepp et al. |
| 5,446,919 A | 8/1995 | Wilkins |
| 5,448,568 A | 9/1995 | Delpuch et al. |
| 5,499,046 A | 3/1996 | Schiller et al. |
| 5,515,098 A | 5/1996 | Carles |
| 5,515,270 A | 5/1996 | Weinblatt |
| 5,519,433 A | 5/1996 | Lappington et al. |
| 5,526,035 A | 6/1996 | Lappington et al. |
| 5,537,141 A | 7/1996 | Harper et al. |
| 5,548,532 A | 8/1996 | Menand et al. |
| 5,550,735 A | 8/1996 | Slade et al. |
| 5,566,353 A | 10/1996 | Cho et al. |
| 5,584,025 A | 12/1996 | Keithley et al. |
| 5,585,838 A | 12/1996 | Lawler et al. |
| 5,585,858 A | 12/1996 | Harper et al. |
| 5,594,910 A | 1/1997 | Filepp et al. |
| 5,610,653 A | 3/1997 | Abecassis |
| 5,617,142 A | 4/1997 | Hamilton |
| 5,632,007 A | 5/1997 | Freeman |
| 5,634,849 A | 6/1997 | Abecassis |
| 5,636,346 A | 6/1997 | Saxe |
| 5,638,113 A | 6/1997 | Lappington et al. |
| 5,652,615 A | 7/1997 | Bryant et al. |
| 5,671,225 A | 9/1997 | Hooper et al. |
| 5,682,196 A | 10/1997 | Freeman |
| 5,684,918 A | 11/1997 | Abecassis |
| 5,696,869 A | 12/1997 | Abecassis |
| 5,717,814 A | 2/1998 | Abecassis |
| 5,717,923 A | 2/1998 | Dedrick |
| 5,724,091 A | 3/1998 | Freeman et al. |
| 5,724,472 A | 3/1998 | Abecassis |
| 5,724,521 A | 3/1998 | Dedrick |
| 5,734,413 A | 3/1998 | Lappington et al. |
| 5,740,388 A | 4/1998 | Hunt |
| 5,740,549 A | 4/1998 | Reilly et al. |
| 5,754,939 A | 5/1998 | Herz et al. |
| 5,758,259 A | 5/1998 | Lawler |
| 5,761,601 A | 6/1998 | Nemirofsky et al. |
| 5,764,275 A | 6/1998 | Lappington et al. |
| 5,768,521 A | 6/1998 | Dedrick |
| 5,774,170 A | 6/1998 | Hite et al. |
| 5,774,664 A | 6/1998 | Hidary et al. |
| 5,778,181 A | 7/1998 | Hidary et al. |
| 5,784,095 A | 7/1998 | Robbins et al. |
| 5,784,528 A | 7/1998 | Yamane et al. |
| 5,796,945 A | 8/1998 | Tarabella |
| 5,802,314 A | 9/1998 | Tullis et al. |
| 5,805,974 A | 9/1998 | Hite et al. |
| 5,825,884 A | 10/1998 | Zdepski et al. |
| 5,835,087 A | 11/1998 | Herz et al. |
| 5,861,881 A | 1/1999 | Freeman et al. |
| 5,867,208 A | 2/1999 | McLaren |
| 5,873,068 A | 2/1999 | Beaumont et al. |
| 5,887,243 A | 3/1999 | Harvey et al. |
| 5,903,263 A | 5/1999 | Emura |
| 5,907,837 A | 5/1999 | Ferrel et al. |
| 5,913,031 A | 6/1999 | Blanchard |
| 5,917,830 A | 6/1999 | Chen et al. |
| 5,929,850 A | 7/1999 | Broadwin et al. |
| 5,931,901 A | 8/1999 | Wolfe et al. |
| 5,937,331 A | 8/1999 | Kalluri et al. |
| 5,978,799 A | 11/1999 | Hirsch |
| 5,986,692 A | 11/1999 | Logan et al. |
| 5,991,735 A | 11/1999 | Gerace |
| 6,002,393 A | 12/1999 | Hite et al. |
| 6,018,768 A | 1/2000 | Ullman et al. |
| 6,026,368 A | 2/2000 | Brown et al. |
| 6,029,045 A | 2/2000 | Picco et al. |
| 6,038,000 A | 3/2000 | Hurst, Jr. |
| 6,038,367 A | 3/2000 | Abecassis |
| 6,049,569 A | 4/2000 | Radha et al. |
| 6,067,348 A | 5/2000 | Hibbeler |
| 6,075,551 A | 6/2000 | Berezowski et al. |
| 6,108,486 A | 8/2000 | Sawabe et al. |
| 6,137,834 A | 10/2000 | Wine et al. |
| 6,141,358 A | 10/2000 | Hurst, Jr. et al. |
| 6,160,570 A | 12/2000 | Sitnik |
| 6,304,852 B1 | 10/2001 | Loncteaux |
| 6,327,574 B1 | 12/2001 | Kramer et al. |
| 6,330,286 B1 | 12/2001 | Lyons et al. |
| 6,343,287 B1 | 1/2002 | Kumar et al. |
| 6,357,042 B2 | 3/2002 | Srinivasan et al. |
| 6,360,234 B2 | 3/2002 | Jain et al. |
| 6,408,278 B1 | 6/2002 | Carney et al. |
| 6,411,992 B1 | 6/2002 | Srinivasan et al. |
| 6,424,991 B1 | 7/2002 | Gish |
| 6,449,657 B2 | 9/2002 | Stanbach, Jr. et al. |
| 6,457,010 B1 | 9/2002 | Eldering et al. |
| 6,463,444 B1 | 10/2002 | Jain et al. |
| 6,463,585 B1 * | 10/2002 | Hendricks ............... H04N 7/10 |
| 6,466,975 B1 | 10/2002 | Sterling |
| 6,483,585 B1 | 11/2002 | Yang |
| 6,487,721 B1 | 11/2002 | Safadi |
| 6,502,076 B1 | 12/2002 | Smith |

(56) References Cited

U.S. PATENT DOCUMENTS

| | | | |
|---|---|---|---|
| 6,507,587 B1 * | 1/2003 | Bahl | H04B 7/212 370/443 |
| 6,567,980 B1 | 5/2003 | Jain et al. | |
| 6,574,793 B1 | 6/2003 | Ngo et al. | |
| 6,588,013 B1 | 7/2003 | Lumley et al. | |
| 6,601,237 B1 | 7/2003 | Ten Kate et al. | |
| 6,611,624 B1 | 8/2003 | Zhang et al. | |
| 6,671,880 B2 | 12/2003 | Shah-Nazaroff et al. | |
| 6,678,332 B1 | 1/2004 | Gardere et al. | |
| 6,681,395 B1 | 1/2004 | Nishi | |
| 6,694,482 B1 | 2/2004 | Arellano et al. | |
| 6,698,020 B1 | 2/2004 | Zigmond et al. | |
| 6,735,628 B2 | 5/2004 | Eyal | |
| 6,785,289 B1 | 8/2004 | Ward et al. | |
| 6,806,909 B1 | 10/2004 | Radha et al. | |
| 6,850,252 B1 | 2/2005 | Hoffberg | |
| 6,857,024 B1 | 2/2005 | Chen et al. | |
| 6,877,134 B1 | 4/2005 | Fuller et al. | |
| 7,039,932 B2 | 5/2006 | Eldering | |
| 7,448,063 B2 | 11/2008 | Freeman et al. | |
| 8,418,214 B2 | 4/2013 | Schiller et al. | |
| 2001/0013124 A1 | 8/2001 | Klosterman et al. | |
| 2001/0037500 A1 | 11/2001 | Reynolds et al. | |
| 2002/0026359 A1 | 2/2002 | Long et al. | |
| 2002/0056093 A1 * | 5/2002 | Kunkel | H04N 7/16 725/35 |
| 2002/0057336 A1 | 5/2002 | Gaul et al. | |
| 2002/0087975 A1 * | 5/2002 | Kaplan | H04N 27/025 725/34 |
| 2002/0083443 A1 | 6/2002 | Eldering et al. | |
| 2002/0087976 A1 | 7/2002 | Kaplan et al. | |
| 2002/0092017 A1 | 7/2002 | Klosterman et al. | |
| 2002/0095676 A1 | 7/2002 | Knee et al. | |
| 2002/0104083 A1 * | 8/2002 | Hendricks | H04H 20/10 348/E7.036 |
| 2002/0184047 A1 * | 12/2002 | Plotnick | H04N 5/445 705/1.1 |
| 2003/0110500 A1 | 6/2003 | Rodriguez | |
| 2003/0149991 A1 * | 8/2003 | Reidhead | H04L 1/24 725/119 |
| 2003/0177503 A1 | 9/2003 | Sull et al. | |
| 2004/0025180 A1 | 2/2004 | Begeja et al. | |
| 2004/0111742 A1 | 6/2004 | Hendricks et al. | |
| 2004/0128682 A1 * | 7/2004 | Liga | H04N 5/445 725/35 |
| 2004/0136698 A1 | 7/2004 | Mock | |
| 2004/0148625 A1 * | 7/2004 | Eldering | H04N 5/445 |
| 2005/0039205 A1 * | 2/2005 | Riedl | H04N 7/16 |
| 2005/0086691 A1 | 4/2005 | Dudkiewicz et al. | |
| 2005/0086692 A1 | 4/2005 | Dudkiewicz et al. | |
| 2005/0166224 A1 | 7/2005 | Ficco | |
| 2005/0193410 A1 | 9/2005 | Eldering | |
| 2005/0235318 A1 | 10/2005 | Grauch et al. | |

* cited by examiner

SYSTEM AND METHOD FOR DIGITAL PROGRAM INSERTION IN CABLE SYSTEMS

RELATED APPLICATION

The present application claims the benefit of U.S. Provisional Application No. 60/600,664 filed on Aug. 11, 2004, which is incorporated herein by reference.

FIELD OF THE INVENTION

This invention is directed towards digital media transmission, and more particularly towards transmission of digital programs to end viewers.

BACKGROUND

Cable operators use their infrastructure to carry programming content and deliver (sell) this to their subscribers. As part of their agreements with some programmers, the cable operator can also be allowed to insert commercial messages in those network feeds. The operator is typically allowed to do that only at selective times (sometimes called "local avails", "avails", "local breaks", or "breaks"), typically 1-3 minutes per hour. The operator can choose to either sell this time to advertisers (generating extra revenue), or use the time to insert promotional messages for their own products and services.

Cable operators have used the following set up illustrated in FIG. 1 to implement local commercial insertion. The programmer typically distributes their feed via satellite 22 to the various cable operators. The feed can be analog or even digitally encoded. The feed contains signals (in the form of audio tones called "cue tones") that indicate a local break to the cable operator.

The receiver at the cable operator receives the satellite signal 20 (decompresses it in case of a digital signal), strips off the audio tone, passes through the (analog) feed 24 to the ad inserters 26, and (separately) passes the Insertion (Control) Signal 25 to the ad inserter as well (triggered by the cue tone in the feed). The Traffic & Billing system 28 is responsible for scheduling the commercial messages across the day, it feeds schedule files to ad inserters 26 (typically once a day) with today's insertion schedules.

Separately (and typically at least one day before airing), the commercial messages are loaded into the ad inserters 26 (this can be encoded from tape, or transcoded from a digital format).

The ad inserter 26 as shown in FIG. 2A typically just "passes through" the incoming analog feed, but whenever it gets an "insert" signal, as shown in FIG. 2B, it looks in its schedule to see which message should be inserted, then looks up the message in its internal database 30, and inserts the message into the (analog) feed.

Messages can be any length (as long as they fit in the "avails" that are agreed upon between the programmer and operator), but typical lengths are 30 second, 60 seconds, or 15 seconds.

Cable operators typically have the right to insert local messages on a variety of different networks. In addition to this, typical cable systems consist of multiple ad insertion zones (or ad insertion head ends). So if a cable operator serves an area (say a city) that consists of <n> insertion zones, and wants to insert commercial messages on <m> different networks, a total of <n>×<m> ad inserters are needed. This enables the operator to insert unique (different) commercial messages in each zone/network combination, but at a high cost for equipment.

With the introduction of digital television, cable operators now need to upgrade their insertion infrastructure in order to be able to insert commercial messages into already compressed (digital) feeds. This new system (called DPI, or Digital Program Insertion) is illustrated in FIG. 3. The programmer typically distributes their feed via satellite 22 to the various cable operators. The feed is digitally encoded. The feed contains signals (in the form of special messages, such as the "SCTE 35" messages that are standardized for this purpose by SCTE) that indicate a local break to the cable operator.

The receiver at the cable operator receives the satellite signal and passes it through (including the digital messages) to a new device called a splicer 34. The splicer 34 (among other things) will detect the digital messages in the stream 33, and start an interaction with the digital ad server 36 to get a digitally encoded commercial that is ready for insertion, it will then "splice" that digital commercial into the digital feed 33 during the local avail. The output signal 38 will be a digital signal with a local commercial during the local avail, and is distributed to digital reception devices at the consumers premises (typically a digital set-top box, or a digital TV set).

One of the reasons why digital insertion is more complex, is that insertion (splicing) of a digital commercial in a digital feed is not as straightforward as the simple "switch" that is embedded in the analog ad inserter 26 (see FIG. 2). Instead it needs a fairly sophisticated splicer 34, which is typically external to the ad inserter 26.

Scalability for digital insertion is similar to analog insertion, if a cable operator serves <n> insertion zones, and wants to insert commercial messages on <m> different digital networks, a total of <n>×<m> ad inserters and splicers are needed. Again, this enables the operator to insert unique (different) commercial messages in each zone/network combination.

One of the trends in local cable advertising is to combine all ad insertion zones and capabilities into a single "Interconnect". An Interconnect typically covers a complete city and may consist of one cable operator, or even a combination of multiple cable operators. It essentially connects all ad inserters so that a client (e.g. an advertiser) can approach the whole market as a single entity, can place single orders, and there is a single T&B (traffic and billing) system driving the insertion schedules. In addition the technical part of the interconnect is typically run from a single command location (Master Control Center). If an Interconnect covers <n> zones, it has the ability to (in any given local avail) air <n> different commercials at the same time in the same program.

There is a large cost involved in converting to digital. Cable operators that "go digital" (in other words: start to distribute their signals to their subscribers in digitally compressed format) obviously face significant investments in infrastructure, digital set-top boxes or other CPE, etc. But on top of these, there is another required investment which is sometimes overlooked, namely the equipment that is needed to insert commercial messages into compressed (digital) program feeds. For a market that contains <n> zones and <m> digitally carried networks, this may add up to <n>× <m> splicers and <n>×<m> digital ad servers, which can be a significant investment.

Therefore, many operators consider "collapsing" their insertion zones to save money (e.g. collapse <n> zones into one (or few) big insertion zones). This reduces investment, but also reduces the unique ability to insert different commercials in different zones (which advertisers can use for reasons of better targeting their messages).

SUMMARY

The present invention provides some alternative approaches to digital commercial insertion for cable operators and others that not only offer more flexibility and features, but may also be significantly cheaper to implement. In one embodiment, the present invention includes a system where the actual "insert" of the commercial or message into the digital program is actually performed by the digital receiver that sits at the consumer's premises (this can be a set-top box, digital TV set, or other). This strongly reduces the need for sophisticated splicer and ad-server equipment at the head-end, while imposing minimal to no additional cost at the receiver devices.

In another embodiment, the present invention includes a system where the actual "insert" of the commercial is performed upstream (for example, at the head-end), yet the number of unique splicers and ad servers is greatly reduced, while preserving the ability to send insert different commercials in different insertion zones.

The present invention includes a method of inserting local commercials into a local feed, including receiving and distributing a digital media stream to a plurality of digital reception devices (for example, set top boxes), detecting a signal in the digital media stream indicating an insertion point, selecting a digitally encoded commercial for insertion; and sending the digitally encoded commercial to the plurality of digital reception devices, at a time as indicated by the signal indicating an insertion point. It further includes providing a signal to at least some of the plurality of digital reception devices to indicate to the some of the plurality of digital reception devices to switch to the digitally encoded commercial. The digital reception devices will switch back to the digital media stream at a time after an end time of the digitally encoded commercial. The digital reception devices may be provided with software to facilitate switching to and from the digitally encoded commercial, or may be hard-coded with firmware, Asics etc. to allow the switching functionality.

The step of sending the digitally encoded commercial to the plurality of digital reception devices may be performed by multiplexing the digitally encoded commercial into the digital media stream. Alternatively, it can be performed by using a feeder channel, or a combination of these techniques.

Some of the digital reception devices may receives a different digitally encoded commercial, depending on the setup of the system. For example, a plurality of digitally encoded commercials may be sent simultaneously to the plurality of digital reception devices, and a filtering process will filter out at least one digitally encoded commercial to prevent it from being received by a selected group of digital reception devices.

A count may be maintained of a number of times the digital reception devices switch to the digitally encoded commercial, and a different digitally encoded commercial may provided depending upon the count.

The present invention also includes a system for inserting local commercials into a local feed. A client ad server component, receives a digital media stream and distributes the digital media stream to a plurality of digital reception devices. When the client ad server component detects a signal in the digital media stream indicating an insertion point, the client ad server component sends a digitally encoded commercial for insertion to the plurality of digital reception devices, at a time as indicated by the signal indicating an insertion point. The client ad server component provides a signal (which may be the same signal as the signal indicating an insertion point, just passed on through) to at least some of the plurality of digital reception devices to indicate to those plurality of digital reception devices to switch to the digitally encoded commercial. The digital reception devices will switch back to the digital media stream at a time after an end time of the digitally encoded commercial.

Another aspect of the present invention includes a system for allowing a plurality of different local messages to be inserted across a plurality of insertion zones. It includes a plurality of splicing components, one splicing component for each different local message, wherein the plurality of splicing components receiving a common network feed. It also includes a programmable switch, having an input port for each of the plurality of splicing components, and having an output port for each of the plurality of insertion zones, wherein the programmable switch is capable of mapping any input port to one or more output ports. A controller controls the plurality of splicing components and the programmable switch, to allow a different local message to be provided to a selected ones of the plurality of insertion zones. The controller can include a prioritizing function to determine the best allocation of local messages to insertion zones in case there are more local messages than splicing components.

This aspect of the invention may also include a initial switch providing the common network feed to the plurality of splicing components, the initial switch to provide for changing the common network feed to a network feed which will subsequently include an insertion point for inserting local messages. Before a local message is complete, the controller can instruct the programmable switch to cause at least one insertion zone to start receiving media from a different splicing component.

An advantage of the present invention include the ability to use present-day set top boxes with minimal "intelligence", for example, without any need for a profiler to help such set top box to decide which local commercial to insert.

Other advantages of the present invention include a more cost efficient way of digital commercial insertion for cable operators and others, but also an approach that inherently provides more flexibility (for example, there is no reason anymore why commercial insertion zones need to be "hard wired" and not change-able once they are done).

BRIEF DESCRIPTION OF THE DRAWINGS

The foregoing and other features and advantages of the present invention will be more fully understood from the following detailed description of illustrative embodiments, taken in conjunction with the accompanying drawings in which.

DETAILED DESCRIPTION

The present invention provides a novel solution to allowing local insertion of content, typically local commercials or ads, into the digital feed for cable operators and other distributors. The present invention may be implemented at several different locations along the delivery process, either in one location or distributed along the delivery stream. Although the present invention is described in terms of commercials and ads, the present invention can be used for insertion of any specific media, such as messages intended for a local audience, or even customized parts of generic commercials, such as the insertion of a local store location at the end of a generic commercial.

Figure 1:
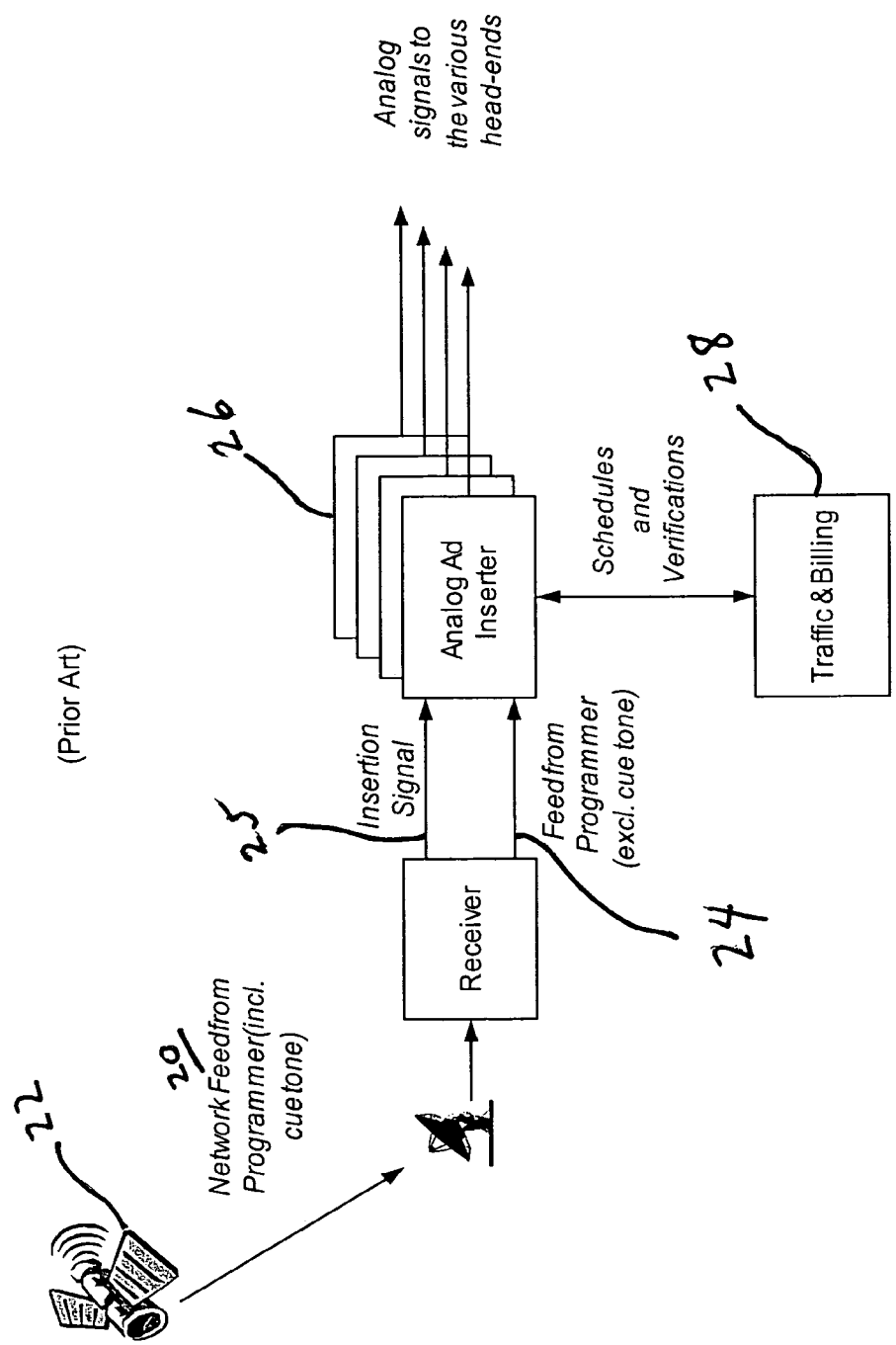
FIG. 1 illustrates a traditional local cable ad insertion system.
Figure 2:
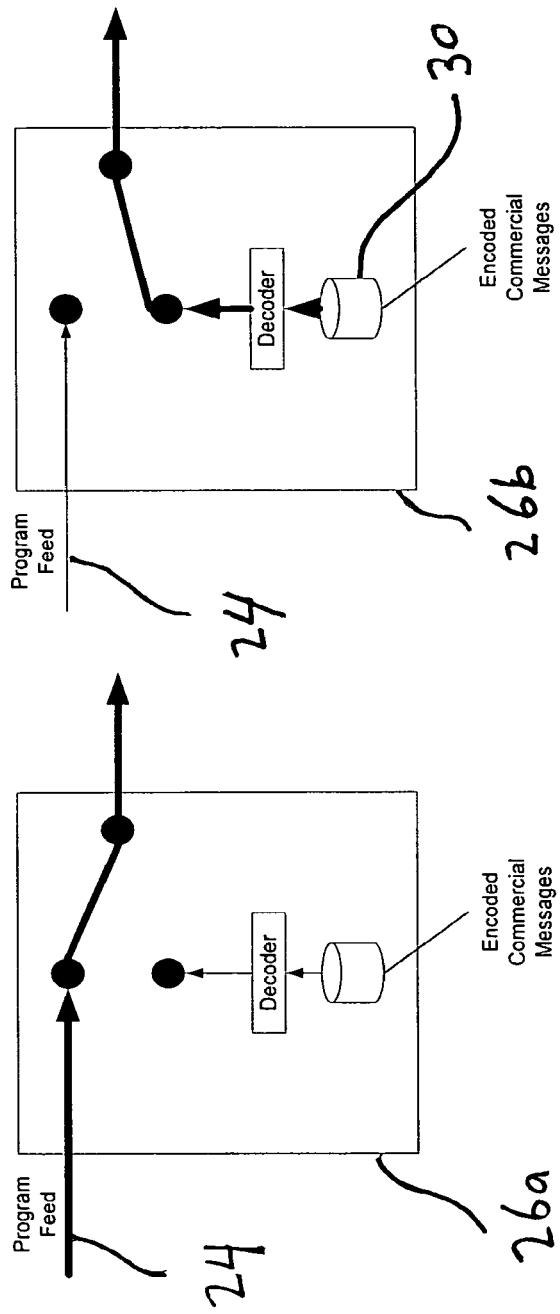
FIGS. 2A and 2B illustrate pass-through and Ad Inserter mode for a traditional ad inserter.
Figure 3:
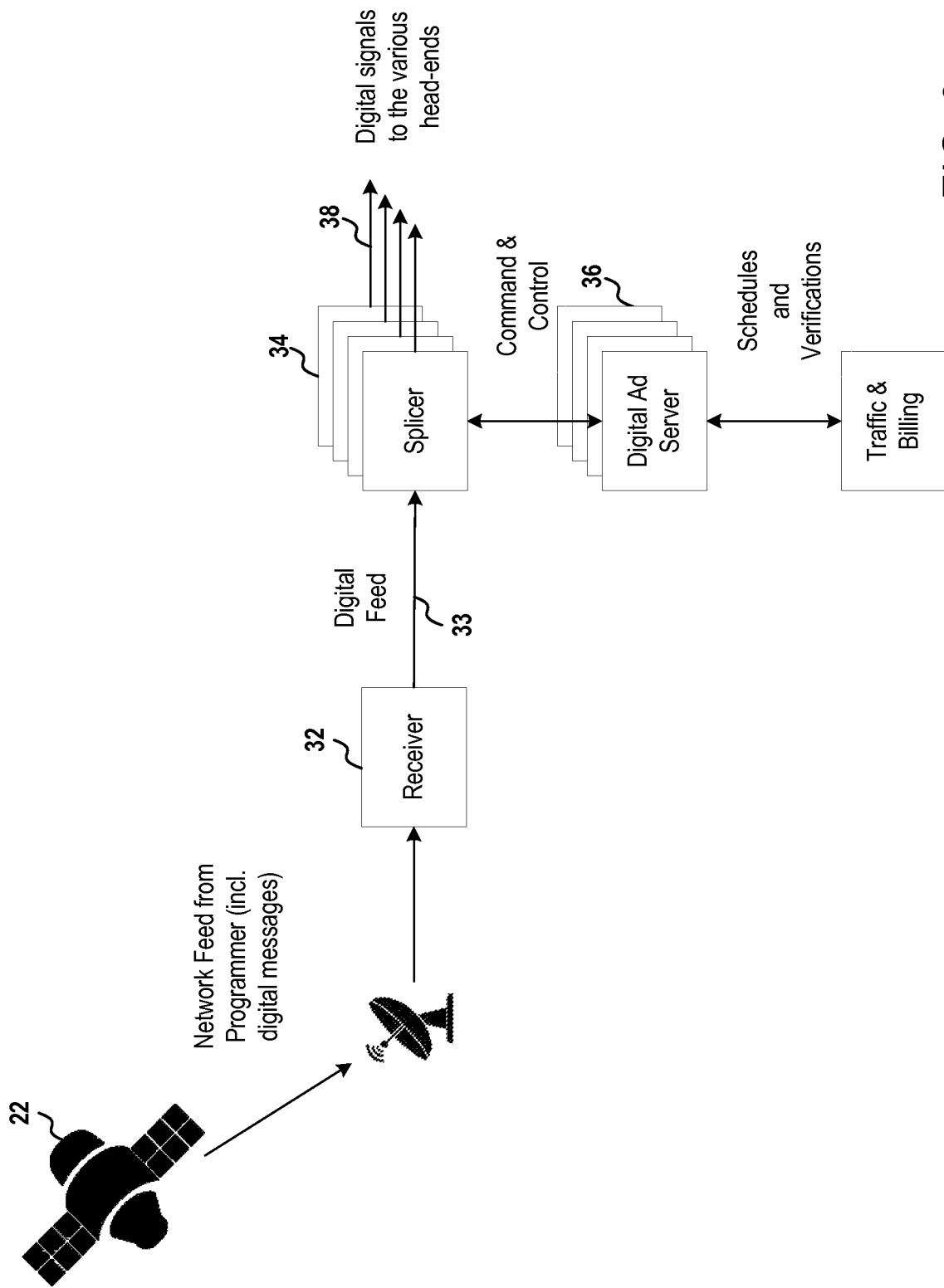
FIG. 3 illustrates a digital local cable ad insertion (DPI)
Figure 4:
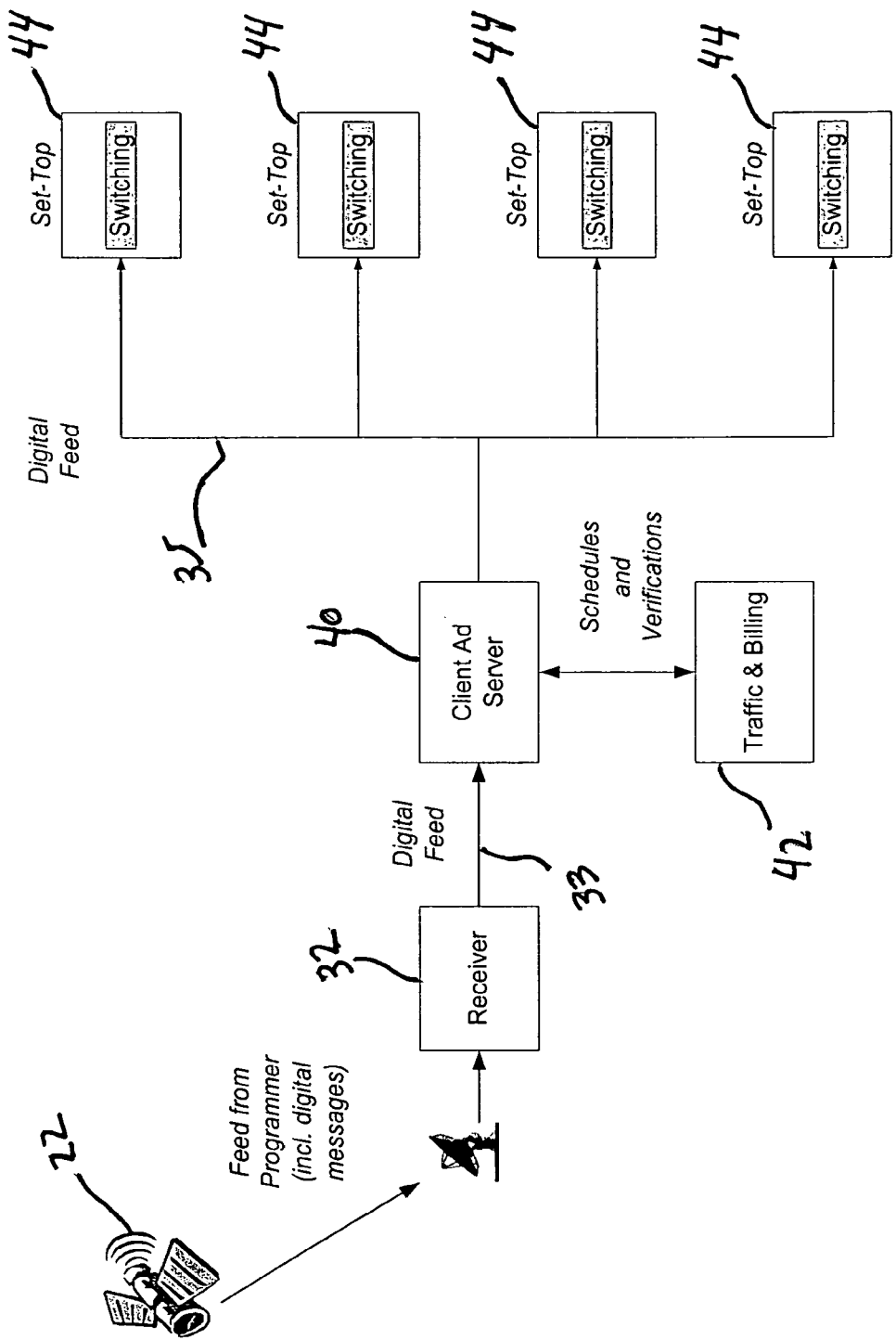
FIG. 4 shows an illustrative embodiment of the present invention for Client Insertion.

An illustrative embodiment of the present invention focusing on using Set-top boxes for insertion shall now be described. In this approach, the insertion (splicing) of commercial messages is pushed down to the individual digital set-top boxes 44 as illustrated in FIG. 4. The programmer distributes their (digitally encoded) feed (including SCTE 35 or other switch messages to signal local avails) via satellite 22 (or by other method) to the various cable operators. The receiver 32 at the cable operator receives the satellite signal and passes it through (including the digital switch messages) to a new device called "Client Ad Server" 40.

The Client Ad Server 40 stores commercials for later play out. Typically such commercials are already in digital form, and compressed. The Client Ad Server 40 also communicates with the Traffic & Billing system 42 so that it understands which commercials are schedule for each local avail. Whenever the Client Ad Server 40 detects a digital insert message (e.g. SCTE 35 message) in the stream 33, it does the following:

Locates a commercial that should be "inserted" in this break, and play it out exactly in sync with the avail (either in the same multiplex, or on a separate multiplex, as described below).

Either passes through the digital insert messages to the set-top boxes 44 downstream, or alternatively replaces them with similar switch messages specifically designed to be handled by set-top boxes 44.

The Set-top boxes 44 are typically ordinary set top boxes, which include special switching logic, typically in the form of an embedded software application. This embedded software may be installed the Set-top boxes 44, or alternatively downloaded to the Set-top boxes 44 through the digital feed 35 or otherwise. The software detects switch messages in the stream 35, and uses them to "switch" to a local commercial during the insertion break. More specifically, in accordance with an illustrative embodiment, at the beginning of an avail the Set-top boxes 44 will switch to the local commercial, and at the end of a specified length of time they will switch back to the program feed 35.

Figure 5:
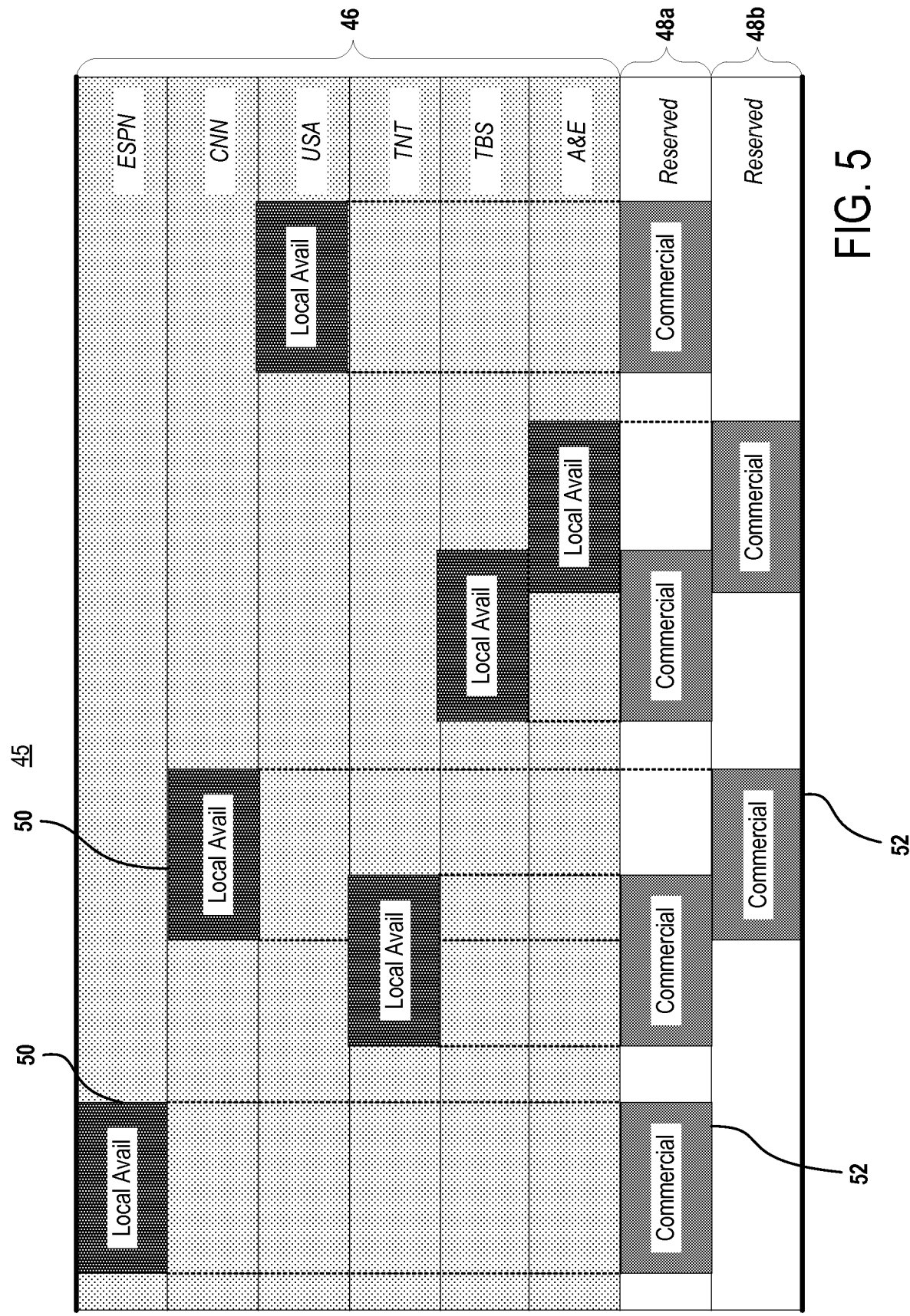
FIG. 5 illustrates how to insert Commercials Within Multiplex according to an illustrative embodiment.

When the Client Ad Server 40 plays out the local commercial exactly in sync with the local avail of the program it needs to be inserted into, there are two options for provided the commercial to the set-top boxes 44. The first option is shown in FIG. 5, where the local commercials are be played out in the same multiplex as the program feed it needs to be "inserted" into. FIG. 5 illustrates a single (MPEG) multiplexed signal 45 that carries six digital program feeds 46 (for this example, ESPN, CNN, USA, TNT, TBS, A&E). These program feeds are merely illustrative and no claim is made to those networks or any affiliation with any such network. The multiplex 45 also has two reserved feeds 48 that are only used during a local avail on any of the six programs 46. Precisely during each of these local avails 50, the reserved feed 48 will carry the local commercial 52 so that the set-top boxes 44 (not shown) can "switch to" and "switch from" the commercial 52 at the beginning and end of the avail 50 respectively.

This approach requires some bandwidth to be reserved in every multiplex 45 that carries digital programs 46 that need local ad insertion. The amount of bandwidth depends on how many overlapping local breaks 50 can occur amongst the digital program feeds 46 within the multiplex 35, in the example there are two reserved feeds 42 so its is possible to handle up to two overlapping avails 50. Other numbers of reserved feeds 42 are possible and within the scope of the invention. Further, there is some room for optimization beyond the number for reserved feeds 42, for example it may be a good idea to concentrate the most valuable program feeds 46 in few multiplexes 45 that have a relatively high number of reserved feeds (for example, four), whereas the less valuable program feeds 46 are carried in multiplexes 45 with lower number of reserved feeds. This would have the effect that the chances of "losing" an avail on valuable feeds 46 is less than loosing an avail on a less valuable network 46.

Figure 6:
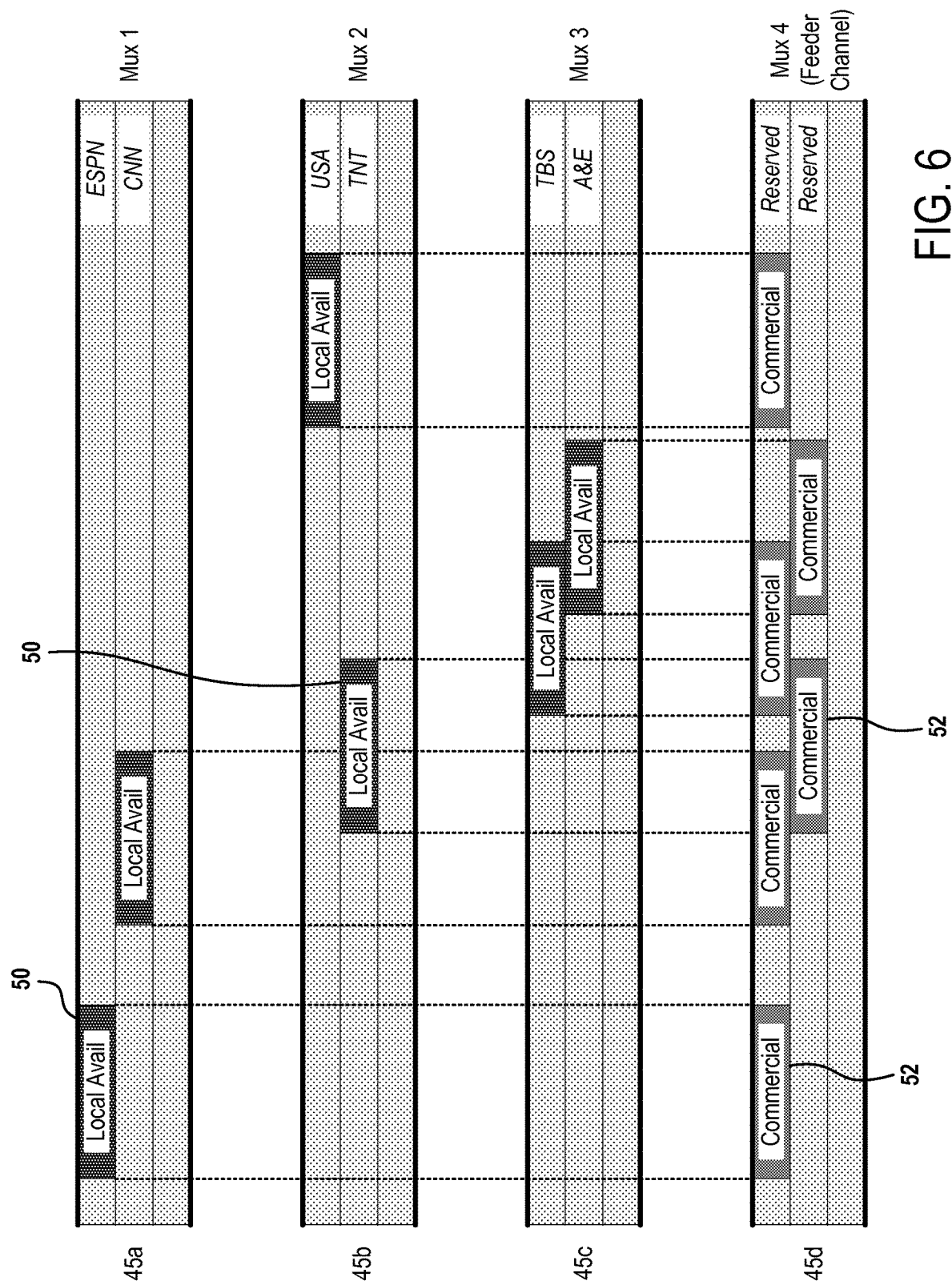
FIG. 6 illustrates how to use Feeder Channel according to an illustrative embodiment.

The second option is shown in FIG. 6 and involves playing the local commercials in a dedicated feeder channel. FIG. 6 illustrates a number (in this case four) of MPEG multiplexes 45. The first three multiplexes (Mux 1-3) carry regular digital program feeds 46 (depending on encoding and modulation, there typically may be as few as seven, or more than twelve program feeds in the multiplexes). The fourth multiplex, Mux-4, is reserved for all local commercials, it is also known as the feeder channel.

The regular program feeds contain local avails 50. Precisely during each of these local avails, the feeder channel Mux-4 will carry the local commercial 52 so that the set-top boxes can "switch to" and "switch from" it at the beginning and end of the avail 50 respectively.

The feeder channel can either be a fully dedicated multiplex/QAM (Quadrature Amplitude Modulation), but it can also be a reserved part of a multiplex/QAM that is partly also used for other services. The amount of bandwidth that has to be reserved in the feeder channel depends on how many overlapping local avails the operator wants to be able to handle with this system. This allocation can be fine-tuned by the cable operator as a trade off between bandwidth and returns.

Each of these embodiments has certain advantages. The first embodiment, within the multiplex 45 has the advantage very simple implementation in set-top box, and can do a cleaner (seamless) splice even with basic set-top boxes. However, it tends to use more bandwidth and may require more sophistication at the head-end, because of the need for re-multiplexing instead of simple play out. The second embodiment, using a feeder channel, has optimal bandwidth efficiency. However it may require more integration in set-top box software (for example, the need to access the tuner). Also, a seamless splice is somewhat more difficult, however this can be fixed by having black frames around the commercial. It is also possible to mix both approaches to achieve the best combination of simplicity, bandwidth efficiency, and other features for a general solution, and also specific requirements.

Focusing now on the Client Ad Server 40, there are a number of different options on the number and location of Client Ad Servers 40 in the cable operators network. In a first centralized example, consider a cable operator in a market that has 50 insertion zones, and 40 networks feeds that require local commercial insertion. We assume that the cable operator uses the Feeder Channel approach to preserve bandwidth. The cable operator may decide to use 40 Client Ad Servers (one for each network feed) and place them at a central location in the system (for example the Master Control Center) to feed all insertion zones.

Figure 7:
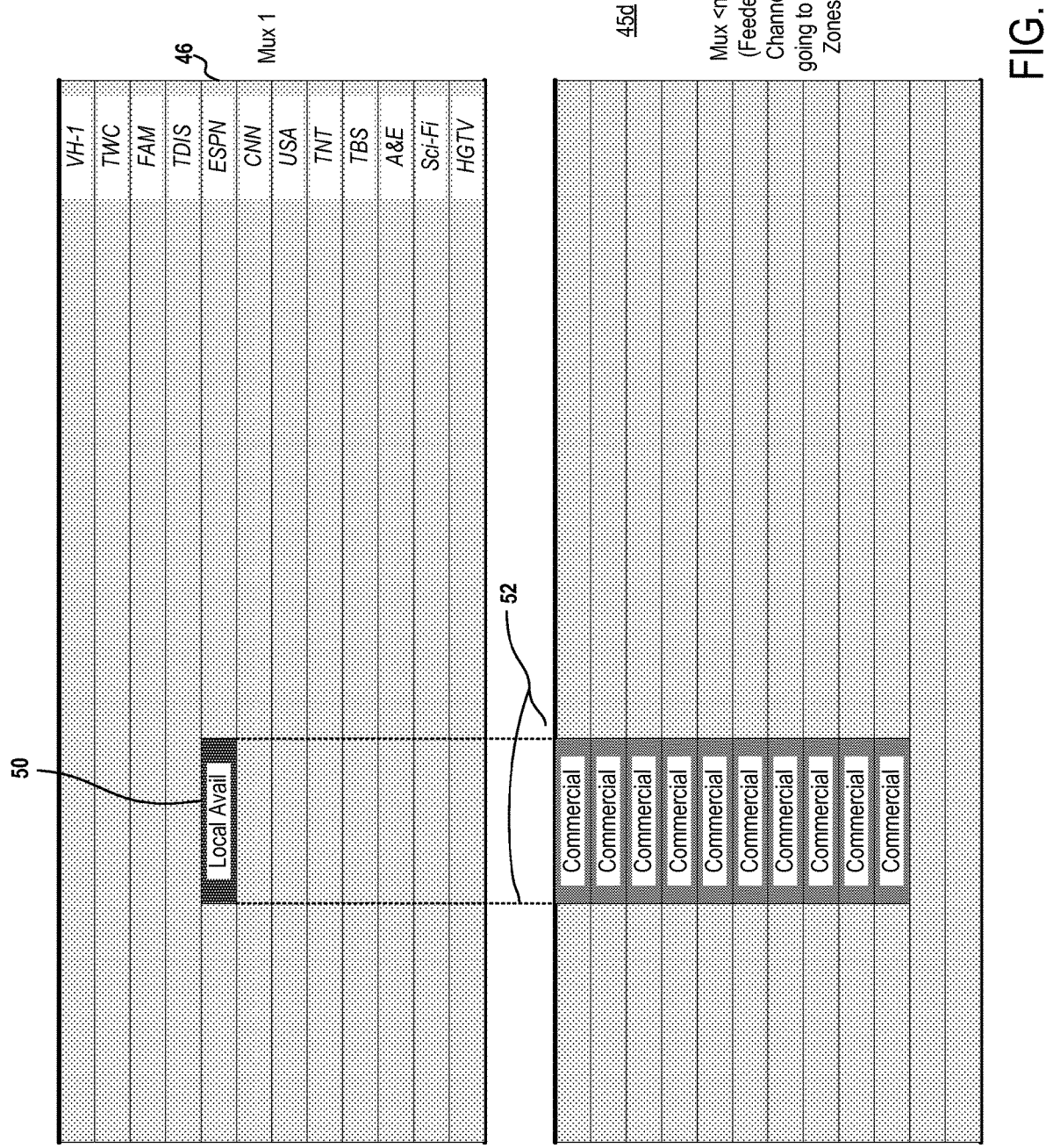
FIG. 7 illustrates a Shared Feeder Channel example.

Now let's look at a local avail 50 FIG. 7 in one of the network feeds 46 (say ESPN). Let's assume the cable operator wants to insert 10 different commercial messages 52 in this local break (one in zones 1-5, one in zones 6-10, etc.). Since there is only one Client Ad Server (not shown) that is shared between all 50 insertion zones, the (bandwidth in the) Feeder Channel 45*d* is also shared. In this scenario the individual set-top boxes will be instructed which commercial message to select (which will depend on the insertion zone they are a member of).

Figure 8:
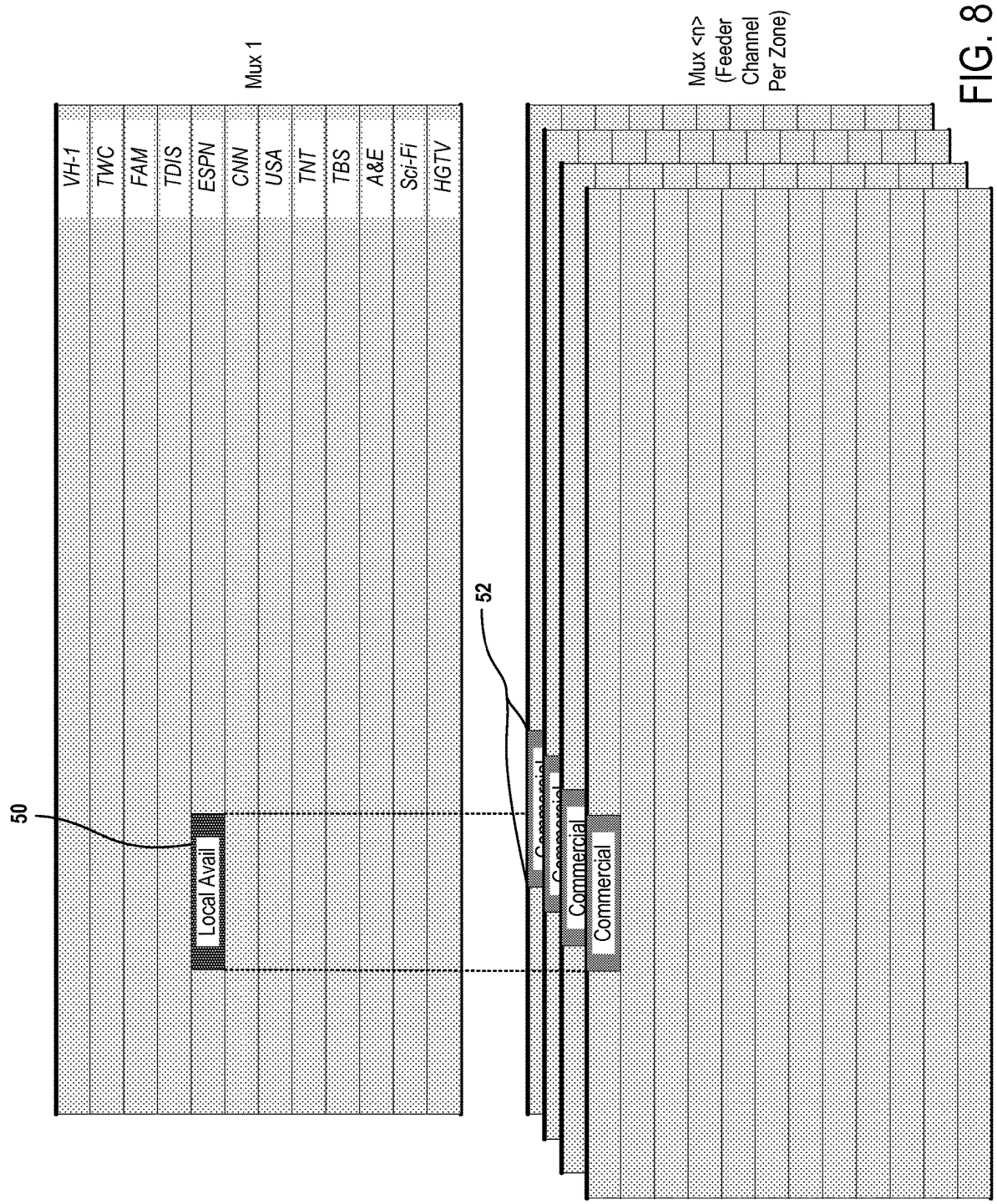
FIG. 8 illustrates a Unique Feeder Channels Per Zone example.

Turning now to a decentralized option, the system can be implemented with a Client Ad Server 40 per insertion zone (so for this example, fifty in total). In the same local insertion example (ESPN, ten commercials) each of the Client Ad Servers 40 will only insert one commercial 52 in the Feeder Channel (namely the one that is intended for its specific insertion zone), as illustrated in FIG. 8. In this scenario, the set-top box does not need specific (zone dependent) instructions in order to "pick" from multiple local commercials 52, making this implementation simpler.

Figure 9:
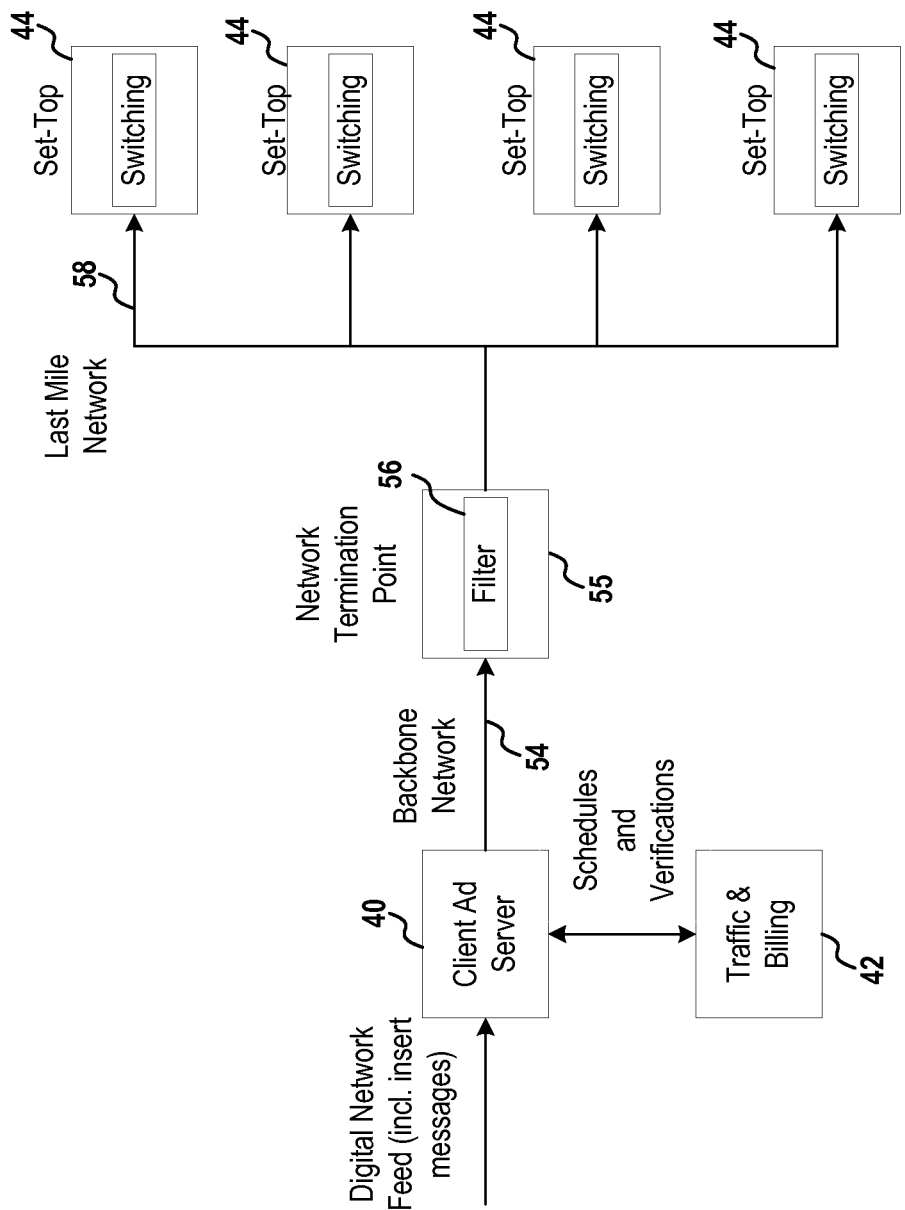
FIG. 9 illustrates a Cascaded Approach example.

A final example shown in FIG. 9 provides a cascaded approach, where a single Client Ad Server 40 per network feed is used in combination with a number of "filter" units 56 downstream to optimize bandwidth usage. This approach puts a single Client Ad Server 40 (per network feed) in a central location (similar to example 1), which would transmit a feeder channel with all different local commercials in it over the backbone network 54 to each head-end or node 55 (similar to FIG. 7). However at the head-end or node 55 (where the backbone network terminates and is connected to the "Last Mile" coax network 58) a special filter 56 strips the feeder channel from all local commercials but the one that is relevant for this insertion head end 55, so the actual feeder channel that is transmitted to the individual homes looks like FIG. 8. Examples of filter units 56 may be an existing edge device such as an edge-QAM modulator, that simply only passes one of the feeder channels through, ignoring all others. It could know which one to pass through by configuring it at installation time, so every QAM would be configured to "pass" unique feeder channels). Other possible approaches are also within the scope of the invention.

An advantage of this setup is only one Client Ad Server 40 is needed per network feed, and the Set Top Box does not need specific (zone dependent) instructions for picking the proper local commercial.

Figure 10:
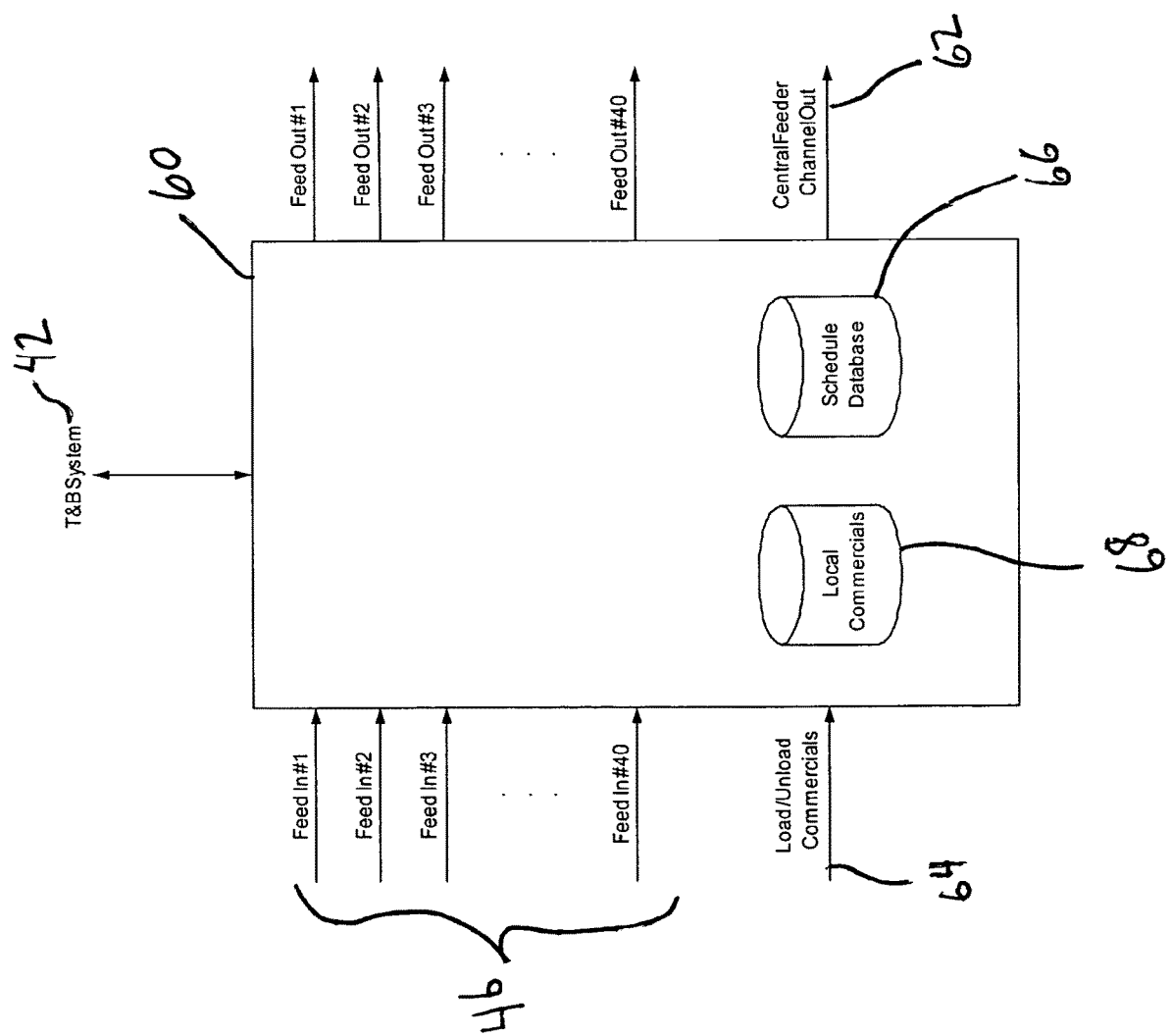
FIG. 10 is a block diagram of a Client Ad Server Unit (CASU) according to an illustrative embodiment.

An illustrative implementation is a cascaded approach with a feeder channel. In this implementation, a single Client Ad Server Unit (CASU) 60 is installed at a central location in the cable operators network (e.g. at the Master Control Center). The CASU 60 FIG. 10 performs the following tasks:

It passes through all digital program feeds 46 of programs that have local avails, and detects incoming insert messages (it also passes these insert messages through, or generate set-top box specific ones, as previously described).

It manages the Central Feeder Channel 62 (which is carried to each head-end over the backbone network), and plays out all required local commercials on the Feeder Channel 62 during each relevant local break It has a network interface 64 for loading/unloading new commercial messages that it (may) need to insert locally.

It has an interface to Traffic & Billing systems 42, so that it knows which local commercials should be inserted across the whole market in a specific break. It can also maintain logs of which local commercials have been viewed a certain number of times (broken down by zone, if helpful), and can choose to substitute/rotate through different commercials based on any desired formula.

The CASU 60 functions as follows:

There is an interface 64 for loading new local commercials onto the CASU 60, and removing commercials off of the CASU 60 when they are no longer needed. Local commercials are loaded in digitized form and stored 68. This interface can be driven by an asset management system, or by a local operator. Local commercials are given a unique identifier when loaded on the CASU.

The T&B System 42 has a dedicated interface for loading scheduling information into the CASU 60. This information basically defines which local commercial needs to be inserted in which feed under which conditions (time, etc.). The CASU 60 stores this scheduling information in its internal schedule database 66.

Up to forty network program feeds 46 can enter the CASU 60. Although forty feeds 46 were chosen because cable operators typically insert into forty networks only, this selection is arbitrary and can be any number of feeds. These feeds 46 may contain digital insert messages to signal a local avail. The CASU 60 will pass through the feeds and whenever there is a local avail, it will access its internal database 66 to determine which local commercials need to be inserted, and play these commercials on the Central Feeder Channel output port 62 exactly during the local avail. In addition it may also be necessary to send some additional information to the set-top boxes downstream (either by inserting additional information in the program feeds, or otherwise), this information may include where in the central feeder channel 62 the local commercials are played out. The forty input feeds, forty output feeds, and central feeder channel output feed can physically be mapped on connectors such as DVB-ASI, DVB-DHEI, or any other interface. It is also possible to map/combine multiple logical inputs and/or outputs into one physical connector.

The CASU 60 will also manage bandwidth of the central feeder channel. For example if the system only has bandwidth to deal with <n> overlapping local commercials, and there actually are more than <n> overlapping commercials scheduled, it may either request additional bandwidth or select the <n> local commercials that can be served. It can do that based on simple "First-Come-First-Served" selection, or based upon more sophisticated algorithms that select the commercials with the highest value.

A second useful component of this system is a Filter Unit 56 FIG. 9 that sits in each insertion zone. It simply takes the central feeder channel 62 FIG. 10 as an input (containing all different local commercials during each break) and strips out all but the one that is intended for this insertion zone. It produces a Local Feeder Channel that is then transmitted to the homes (and set-top boxes) in the zone. The filter unit 56 basically makes the Set top box's job simple by avoiding needing the set top box to have intelligence to pick the correct insertion commercial.

Another component of this system is a software application that resides in the set-top box 44. The application can be resident or downloadable, it does not have a user interface, does not need a return channel per se, and performs the following functions:

When started the application goes into "passive mode" and starts "listening" to digital insert messages in the current program feed.

Whenever an insert message is detected, the location of the local commercial in the local feeder channel is retrieved. Examples of retrieval include providing the commercial with the insertion message, or the commercial can be communicated to the set top box separately. The application retunes the set-top box to that local commercial at the start of the local avail, and tunes back to the original program feed at the end of the local avail. Typically, this will all be transparent to the user.

Figure 11:
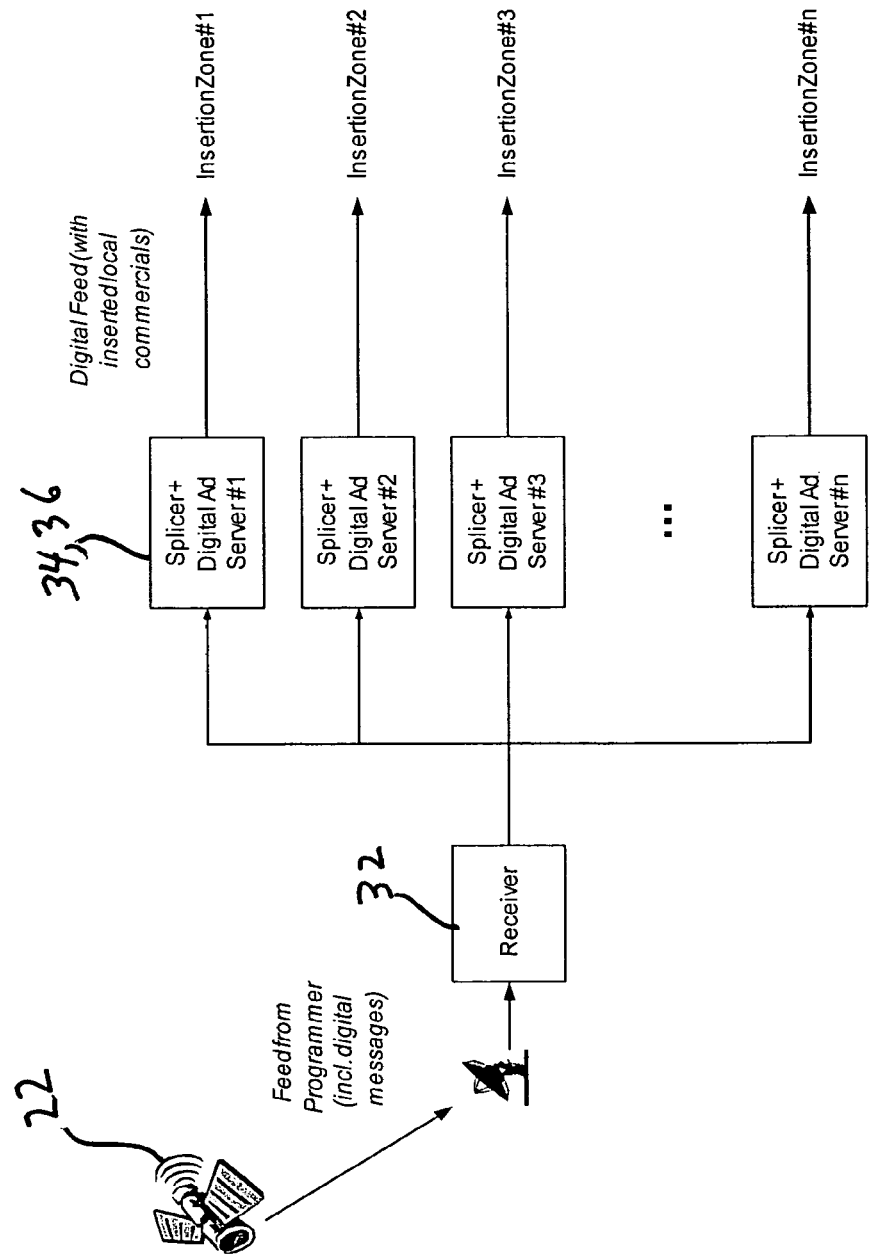
FIG. 11 is a block diagram illustrating Signal Paths for Digital Insertion.

Another embodiment of the present invention is based on the notion that the current network topology (with individual inserters per insertion zone) is in many cases may be overkill. FIG. 11 shows the signal paths for digital insertion in a single program feed by a cable operator that has <n> insertion zones (for the sake of simplicity each combination of a splicer 34 and a digital ad server 36 is represented as a single box)

This setup gives the cable operator the ability to insert (in a given local avail) a unique and different local commercial in each insertion zone. In reality however, in most cases the cable operator will either insert the same local commercial in all zones, or only a limited set of different local commercials mapped on the various insertion zones (for example in a market with fifty insertion zones, there may be five different commercials, the first going to zones 1-10, the second one going to zones 11-20, etc.). Another way of saying this is that in the traditional setup of ad insertion (such as in FIG. 11) the system is dimensioned for the worse case usage scenario, but does not take advantage of the fact that statistically the cable operator will only use a fraction of that.

Figure 12:
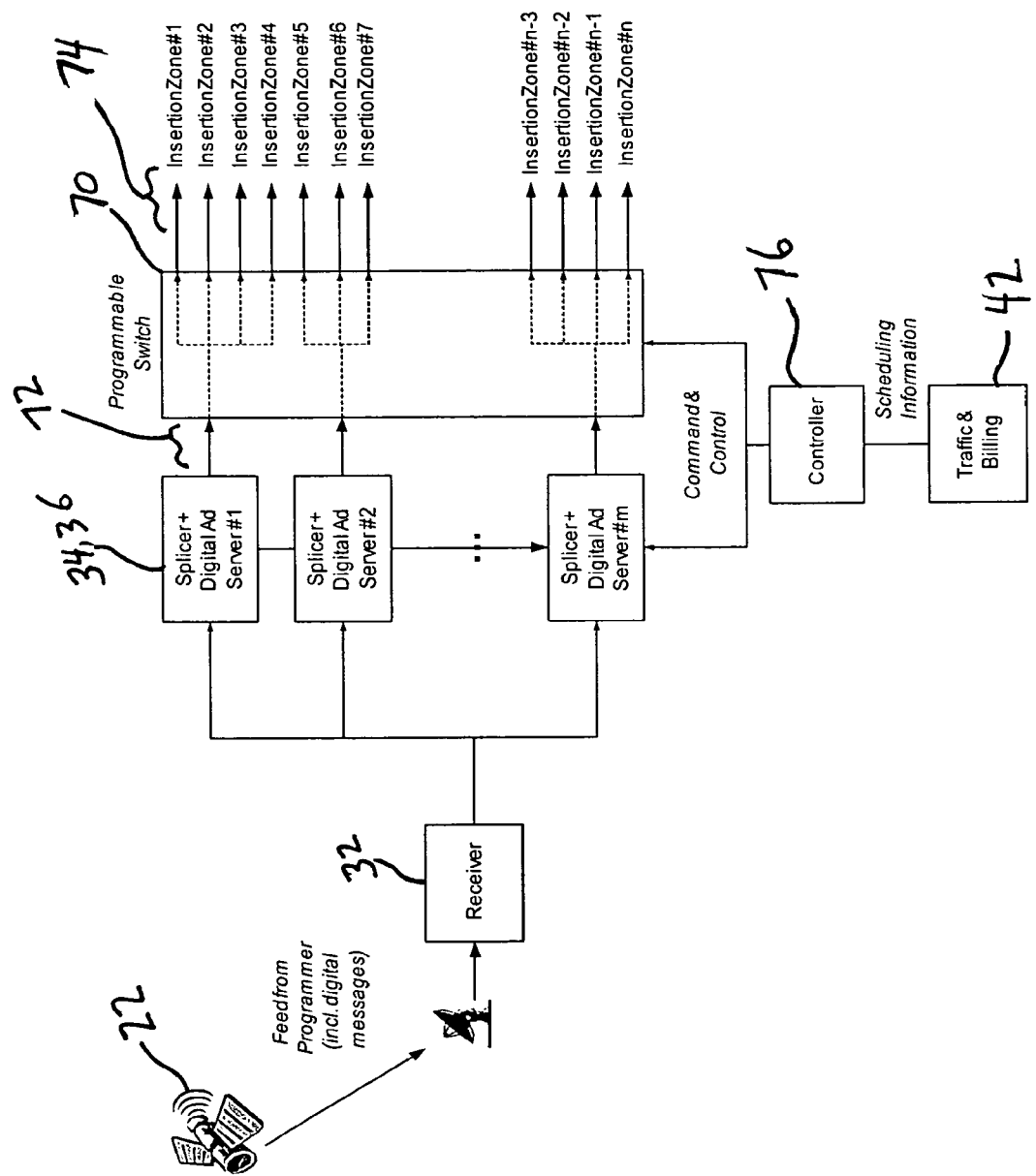
FIG. 12 illustrates an embodiment for Optimized Digital Insertion.

An alternative setup for digital program insertion according on an embodiment of the present invention is shown in FIG. 12. This setup allows for a maximum of <m> different local commercials to be inserted across <n> insertion zones. This setup consists of the following components:

A total of <m> splicer/ad-server combinations 34, 36 are set up, all connected to the incoming program feed.

A programmable switch 70 is set up. It has <m> input ports 72, and <n> output ports 74, and can be programmed to map any input port onto any combination of output ports. Its input ports are connected to the output ports of the splicers 34,36. Its output ports are connected to each insertion zone.

A controller 76 is provided. It interfaces with the T&B system 42 on one hand, and with the splicer/ad-servers 34, 36 and programmable switch 70 on the other hand.

The system operates as follows:

The T&B System 42 communicates scheduling information to the controller 70, who stores this in its internal database.

Whenever there is a local avail, the splicers 34 will detect it (through the presence of digital insertion messages) and inform the controller 76.

The controller 76 will then determine which local commercials need to be inserted in which insertion zones, and assign each unique local commercial to exactly one splicer/ad-server 34, 36 pair. The controller 76 will also program the switch 70 so that the output of each splicer 34 is mapped to the correct insertion zones.

Because of time and scheduling, the controller 76 typically will know in advance when a local avail is coming up, and can 'preprogram' the switch 70 to divide up the inter-zones by appropriate splicer 34. This setup may be left in place until a next local avail comes up which has a different combination of commercials or insertion zones. Since the splicers 34 are passive when not inserting local commercials, the system will run normally during normal broadcast, no matter how switch 70 has mapped the splicers 34 to insertion zones.

This embodiment is flexible with respect to the choice of the maximum number of unique commercials. Obviously a lower number will create greater cost savings but will also limit flexibility. If in a system with fifty insertion zones (n=50) it would be acceptable to set the maximum number of unique commercials to ten (m=10), this system would create an 80% cost savings on splicer/ad-server pairs when compared with the traditional setup. Further, it is expandable on an incremental basis.

In this embodiment, some of the components may be combined into other physical system components. For example the programmable switch 70 may be a separate unit, or integrated with the controller 76, or even be an integral part of the network (depending on what network is used to distribute program feeds to the insertion zones, this may already be a feature that is built into that network). It should be noted that it is also possible to combine these various approaches to create unique trade offs between investment, features, etc. It should be noted that the present invention can be combined with features described in other pending commonly owned patent applications, including U.S. patent application Ser. No. 09/735,983, entitled Seamless Switching and filed on Dec. 13, 2000; U.S. patent application Ser. No. 10/369,047, entitled Seamless Switching and filed on Feb. 19, 2003; U.S. patent application Ser. No. 10/192,192, entitled System And Method For Seamless Switching Of Compressed Audio Streams and filed on Jul. 9, 2002; U.S. patent application Ser. No. 10/423,280, entitled System And Method For Optimized Channel Switching In Digital Television Broadcasting and filed on Apr. 25, 2003; and U.S. patent application Ser. No. 10/991,674, entitled System And Method For Optimized Encoding And Transmission Of A Plurality Of Substantially Similar Video Fragments and filed on Nov. 18, 2004; which are fully incorporated here by reference.

Although this description is written from the perspective of a cable operator, it is straightforward to apply the same approaches to other network operators as well (for example broadcast networks with affiliates, cable networks with local reception points at head-ends, etc.).

Although the invention has been shown and described with respect to illustrative embodiments thereof, various other changes, omissions and additions in the form and detail thereof may be made therein without departing from the spirit and scope of the invention.

What is claimed is:

1. A method comprising:
receiving a first media stream comprising information indicating an insertion point in the first media stream for insertion of a plurality of local advertisements associated with a plurality of insertion zones;
determining available bandwidth in a network associated with the plurality of insertion zones;
determining, based on the determined available bandwidth, a portion of the plurality of local advertisements that can be served by the determined available bandwidth;
generating, based on the information and the determined portion, a plurality of second media streams that each comprise at least one local advertisement of the portion; and
mapping, to one or more insertion zones of the plurality of insertion zones, output of a second media stream, of the plurality of second media streams, that is associated with the one or more insertion zones, to cause:
sending, to the one or more insertion zones, the second media stream, and
display of the at least one local advertisement at a time indicated by the information.

2. The method of claim 1, wherein the plurality of second media streams comprise at least an MPEG transport stream.

3. The method of claim 1, wherein the at least one local advertisement is multiplexed into the second media stream.

4. The method of claim 1, wherein the at least one local advertisement is stored in a database.

5. The method of claim 1, wherein the determined available bandwidth indicates a number of local advertisements that can be inserted into the plurality of second media streams.

6. The method of claim 1, wherein the plurality of second digital media steams further comprise information indicating the time.

7. The method of claim 1, wherein the plurality of insertion zones comprise at least one computing device configured to cause the display of the at least one local advertisement by one or more reception devices.

8. A device comprising:
one or more processors; and
memory storing instructions that, when executed by the one or more processors, cause the device to:
receive a first media stream comprising information indicating an insertion point in the first media stream for insertion of a plurality of local advertisements associated with a plurality of insertion zones;
determine available bandwidth in a network associated with the plurality of insertion zones;
determine, based on the determined available bandwidth, a portion of the plurality of local advertisements that can be served by the determined available bandwidth;
generate, based on the information and the determined portion, a plurality of second media streams that each comprise at least one local advertisement of the portion; and
map, to one or more insertion zones of the plurality of insertion zones, output of a second media stream, of the plurality of second media streams, that is associated with the one or more insertion zones, to cause:
sending, to the one or more insertion zones, the second media stream, and
display of the at least one local advertisement at a time indicated by the information.

9. The device of claim 8, wherein the plurality of second media streams comprise at least an MPEG transport stream.

10. The device of claim 8, wherein the at least one local advertisement is multiplexed into the second media stream.

11. The device of claim 8, wherein the at least one local advertisement is stored in a database.

12. The device of claim 8, wherein the determined available bandwidth indicates a number of local advertisements that can be inserted into the plurality of second media streams.

13. The device of claim 8, wherein the plurality of second digital media steams further comprise information indicating the time.

14. The device of claim 8, wherein the plurality of insertion zones comprise at least one computing device configured to cause the display of the at least one local advertisement by one or more reception devices.

15. A non-transitory computer-readable storage medium storing computer-readable instructions that, when executed by a processor, cause:
receiving a first media stream comprising information indicating an insertion point in the first media stream for insertion of a plurality of local advertisements associated with a plurality of insertion zones;
determining available bandwidth in a network associated with the plurality of insertion zones;
determining, based on the determined available bandwidth, a portion of the plurality of local advertisements that can be served by the determined available bandwidth;
generating, based on the information and the determined portion, a plurality of second media streams that each comprise at least one local advertisement of the portion; and
mapping, to one or more insertion zones of the plurality of insertion zones, output of a second media stream, of the plurality of second media streams, that is associated with the one or more insertion zones, to cause:
sending, to the one or more insertion zones, the second media stream, and
display of the at least one local advertisement at a time indicated by the information.

16. The non-transitory computer-readable storage medium of claim 15, wherein the plurality of second media streams comprise at least an MPEG transport stream.

17. The non-transitory computer-readable storage medium of claim 15, wherein the at least one local advertisement is multiplexed into the second media stream.

18. The non-transitory computer-readable storage medium of claim 15, wherein the at least one local advertisement is stored in a database.

19. The non-transitory computer-readable storage medium of claim 15, wherein the determined available bandwidth indicates a number of local advertisements that can be inserted into the plurality of second media streams.

20. The non-transitory computer-readable storage medium of claim 15, wherein the plurality of second digital media steams further comprise information indicating the time.

* * * * *